United States Patent Office 3,256,316
Patented June 14, 1966

3,256,316
ADDUCTS OF CYCLOPENTADIENE KETALS
Wen-Hsuan Chang, Gibsonia, Pa., assignor to Pittsburgh Plate Glass Company, Pittsburgh, Pa., a corporation of Pennsylvania
No Drawing. Filed June 11, 1963, Ser. No. 286,906
6 Claims. (Cl. 260—468)

This invention relates to novel Diels-Alder adducts of 1,2,3,4-tetrahalocyclopentadiene 5-ketals with certain unsaturated organic compounds and to their method of preparation.

In copending application, Serial No. 234,847, filed November 1, 1962, there is disclosed a novel class of polyols and their monocarboxylic acid esters and their method of preparation. These polyols are the reaction products of a hexahalocyclopentadiene with an excess of certain polyols, having at least 3 carbon atoms and preferably 3 to 20 carbon atoms. Certain of the polyols and their monocarboxylic acid esters disclosed in application, Serial No. 234,847, constitute one of the starting materials from which are produced the products of this invention.

From among the polyols disclosed in the copending application, the polyols useful in producing the products of this invention correspond to the formula (I)

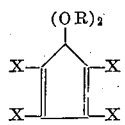

where X is selected from the group consisting of chlorine, bromine and fluorine, preferably chlorine, and R is an organic radical of at least 3 carbon atoms substituted with at least one hydroxyl group, all hydroxyl substituents being in at least the 3 position, or further removed, with respect to the ketal oxygen. The organic radical is a mono- or polyhydroxyl substituted derivative of an alkyl group, a cycloalkyl group, an aralkyl group, or an alkoxyalkyl group. Examples of such compounds are:

5,5-bis(3-hydroxybutoxy)-1,2,3,4-tetrachloro-1,3-cyclopentadiene
5,5-bis(3-hydroxypropoxy)-1,2,3,4-tetrachloro-1,3-cyclopentadiene
5,5-bis(2-hydroxymethyl-2-methylpropoxy)-1,2,34-tetrachloro-1,3-cyclopentadiene
5,5-bis(4-hydroxybutoxy)-1,2,3,4-tetrachloro-1,3-cyclopentadiene
5,5-bis(5-hydroxy-3-oxapentoxy)-1,2,3,4-tetrachloro-1,3-cyclopentadiene
5,5-bis[2,2-bis(hydroxymethyl)butoxy]-1,2,3,4-tetrachloro-1,3-cyclopentadiene
5,5-bis(4-hydroxymethylcyclohexane-1-methoxy)-1,2,3,4-tetrachloro-1,3-cyclopentadiene
5,5-bis(5,6-dihydroxyhexoxy)-1,2,3,4-tetrachloro-1,3-cyclopentadiene
5,5-bis(3-hydroxybutoxy)-1,2,3,4-tetrabromo-1,3-cyclopentadiene The monocarboxylic acid esters useful as starting materials in this invention correspond to the above Formula I, wherein at least one hydroxyl group in at least the 3-position, or further removed, with respect to the ketal oxygen, has been esterified with a monocarboxylic acid, preferably an alkanoic acid having 1 to 20 carbon atoms, benzoic acid or a substituted benzoic acid, such as nitrobenzoic acid. Examples of such compounds are:

5,5-bis(3-acetoxybutoxy)-1,2,3,4-tetrachloro-1,3-cyclopentadiene
5,5-bis(3-acetoxypropoxy)-1,2,3,4-tetrachloro-1,3-cyclopentadiene It has now been discovered that the above-mentioned diols and their monocarboxylic acid esters undergo Diels-Alder type condensation with dienophiles.

Norton, Chemical Review, 31 (1941), pages 310–523, describes the Diels-Alder reaction and describes and lists numerous compounds which function as dienophiles.

The dienophiles useful in producing the novel products of this invention are those containing olefinic carbon to carbon unsaturation, each unsaturated carbon atom having bonded thereto at least one hydrogen atom. Typical dienophiles are those containing the group

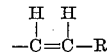

where R may be a carbonyl group attached directly to the olefinic carbon atom. Representative of this type of dienophiles are acids, their anhydrides, esters and halides, and also aldehydes, ketones and quinones. The carbonyl group is not, however, a necessary structural feature. R may be among other groups, such as acetoxyl (as in vinyl acetate), nitro, sulfonyl, cyano, vinyl, aryl, alkyl, ether, or even hydrogen. Any compound which functions as a dienophile in the Diels-Alder reaction, as exemplified by the reaction:

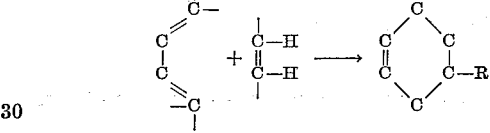

is a dienophile which may be utilized in this reaction. The dienophile may be either cyclic or open chain. Examples of dienophiles which may be utilized are styrene, ethyl acrylate, p-benzoquinone, cyclooctene, cyclopentadiene, vinyl acetate, vinylbutyl ether and N-phenyl maleimide. Other compounds which may be utilized include substituted styrenes such as p-chlorostyrene, p-methyl styrene and other alkyl-substituted styrenes, nitro-substituted styrenes, acrylates such as n-butyl acrylate, tert-butyl acrylate, 2-ethylhexyl acrylate and hydroxypropyl acrylate, vinyl ethers such as vinylethyl ether, vinylpropyl ether and vinylhexyl ether, vinyl esters such as vinyl propionate and vinyl benzoate, and N-alkyl maleimides such as N-ethyl maleimide. Additional compounds include acrolein, diethyl maleate and diethyl fumarate, vinylbutyl ketone, naphthaquinone, acrylic acid, allyl chloride, allyl bromide, crotonyl chloride, dihydrofuran, norbornene, cyclopentene, acrylonitrile and acrylamide.

The compounds of this invention comprise a class of compounds corresponding to the formula

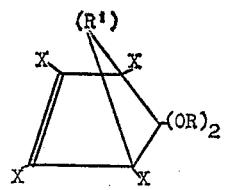

where X is selected from the group consisting of chlorine, bromine and fluorine, preferably chlorine, R is the hydroxy containing moiety as defined above or a monocarboxylic acid ester thereof, and R' is the residual moiety of a dienophile containing olefinic carbon to carbon unsaturation, each of said unsaturated carbon atoms having bonded thereto at least one hydrogen atom, said dienophile having undergone a Diels-Alder condensation through said carbon to carbon unsaturation, with the compounds of Formula I and their monocarboxylic acid esters. For example, where the dienophile is styrene, ethyl acrylate, p-benzoquinone, cyclooctene, cyclopentadiene, vinyl acetate, vinylbutyl ether or N-phenyl maleimide, R' is

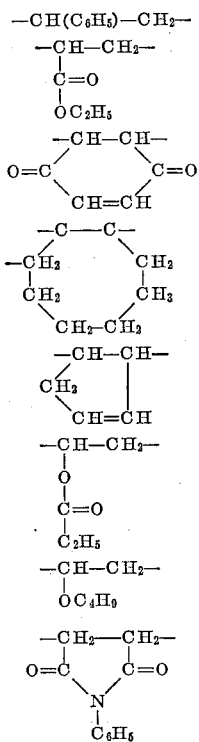

The reaction conditions employed to produce the products of this invention vary widely. For example, the reaction can be carried out at ordinary room temperature (about 25° C.), although somewhat elevated temperatures may be used to induce faster rates of reaction. Preferably, the reaction is carried out between about 70° C. and 200° C., depending upon the reactivity and stability of the particular reactants and products involved in the reaction. The reaction may conveniently be carried out at the reflux temperature of the system. At higher temperatures a polymerization inhibitor may be desirable in order to increase the yield of the desired product.

The proportions of reactants likewise may be varied widely, and if desired an excess of one of the reactants may be used as a solvent. The reaction may also be carried out in the presence of an inert solvent or diluent such as benzene, toluene, high boiling ketones and ethers.

The compounds of the invention may be recovered from the reaction mixture by conventional techniques known to the organic chemist. In some instances the products crystallize out of solution and may be purified by recrystallization with appropriate solvents. When a solvent is used in which the desired product is soluble, removal of the solvent by evaporation or vacuum distillation may render the product crystalline. This product may then be recrystallized if desired. Where the reaction mixture is liquid or a low melting solid, the products may be isolated by vacuum distillation, or by combined distillation and recrystallization. Other techniques such as solvent extraction and chromatography may also be employed to isolate the products of this invention.

There are set forth below several examples which illustrate the method of producing the compounds of this invention and the manner in which such compounds were isolated and identified. These examples are, of course, given by way of illustration only and should not be construed as limiting the invention to the particular details thereof. All parts and percentages set forth, as is true throughout this specification, are by weight unless otherwise specified.

The compounds of the examples were identified by I.R. spectra, U.V. spectra, and elemental analysis.

EXAMPLE I 7,7-bis(3-acetoxybutoxy)-5-phenyl-1,2,3,4-tetrachloro-2-bicyclo[2.2.1]heptane A mixture of 10.0 grams (0.0215 mole) of 5,5-bis-(3-acetoxybutoxy)-1,2,3,4-tetrachlorocyclopentadiene, 10.0 grams (0.096 mole) of styrene, and 60 milliliters of benzene was refluxed for 40 hours. The product was dried and distilled in vacuo to give a quantitative yield of the adduct having a boiling range of 200° C.–202° C. at 0.05 millimeter of mercury.

Analysis.—Calculated for $C_{25}H_{36}Cl_4O_6$:

|  | Calculated (Percent) | Found (Percent) |
| --- | --- | --- |
| Carbon | 52.27 | 52.28 |
| Hydrogen | 6.32 | 5.50 |
| Chlorine | 24.69 | 24.67 |

EXAMPLE II 7,7-bis(3-hydroxybutoxy)-5-phenyl-1,2,3,4-tetrachloro-2-bicyclo [2.2.1]heptene A mixture of 15.0 grams (0.032 mole) of 5,5-bis-(3-hydroxybutoxy)-1,2,3,4-tetrachlorocyclopentadiene, 15.0 grams (0.144 mole) of styrene and 200 milliliters of benzene was refluxed for 40 hours. The product was dried in vacuo and a very viscous oil was obtained which was not crystallizable. This product was distilled to yield a material having a boiling point of 205° C.–215° C./0.05–0.07 millimeter of mercury.

Analysis.—Calculated for $C_{21}H_{26}Cl_4O_4$:

|  | Calculated (Percent) | Found (Percent) |
| --- | --- | --- |
| Carbon | 52.08 | 51.38 |
| Hydrogen | 5.41 | 5.31 |
| Chlorine | 29.29 | 30.08 |

EXAMPLE III 11,11-bis(3-hydroxybutoxy)-2,3,4,5-tetrachloro-3,8-tricyclo[4.4.0.1$^{2,5}$]dodecadiene-7,10-dione A mixture of 15.0 grams (0.032 mole) of 5,5-bis(3-hydroxybutoxy) - 1,2,3,4 - tetrachlorocyclopentadiene, 10.8 grams (0.100 mole) of benzoquinone and 14 milliliters of toluene was heated on a steam bath. After 1.5 hours, solid started to crystallize out. The mixture was heated for a total of 14 hours. The solid cake product was crushed, slurried in toluene and filtered. This crude material had a melting point of 142° C.–152° C. The crude product was recrystallized three times from hot acetone to give a solid melting at 165.5° C.–167.5° C.

Analysis.—Calculated for $C_{19}H_{22}Cl_4O_6$:

|  | Calculated (Percent) | Found (Percent) |
| --- | --- | --- |
| Carbon | 46.73 | 46.76 |
| Hydrogen | 4.54 | 4.89 |
| Chlorine | 29.05 | 29.15 |

EXAMPLE IV 7,7-bis(3-hydroxybutoxy)-5-carbethoxy-1,2,3,4-tetrachloro-2-bicyclo[2.2.1]heptene A mixture of 15.3 grams (0.153 mole) of ethyl acrylate, 15.3 grams (0.032 mole) of 5,5-bis(3-hydroxybutoxy)-1,2,3,4-tetrachlorocyclopentadiene and 200 milliliters of benzene was refluxed for 40 hours. After the solvent was removed by evaporation the product was vacuum distilled.

Fraction I—160° C.–210° C. at 0.12–0.14 millimeter;
Fraction II—210° C. at 0.12–0.14 millimeter;
Fraction II was analyzed as the product.

Analysis.—Calculated for $C_{18}H_{26}Cl_4O_6$:

|  | Calculated (Percent) | Found (Percent) |
| --- | --- | --- |
| Carbon | 45.02 | 44.96 |
| Hydrogen | 5.46 | 5.21 |
| Chlorine | 29.53 | 30.07 |

EXAMPLE V 10,10-bis(3-acetoxybutoxy)-2,3,4,5-tetrachloro-3,7-tricyclo[4.3.0.1$^{2,5}$]decadiene A mixture of 20.0 grams (0.042 mole) of 5,5-bis(3-acetoxybutoxy) - 1,2,3,4 - tetrachlorocyclopentadiene, 5.0 grams (0.075 mole) of cyclopentadiene and 20 milliliters of benzene was kept at room temperature for 96 hours and was then heated on a steam bath for 16 hours. The solvent was removed and the product was distilled under vacuum.
Fraction I—60° C.–210° C. at 0.1 millimeter;
Fraction II—210° C.–212° C. at 0.1 millimeter;
Fraction II was analyzed as the product.
Analysis.—Calculated for $C_{22}H_{28}Cl_4O_6$:

|  | Calculated (Percent) | Found (Percent) |
| --- | --- | --- |
| Carbon | 49.82 | 49.86 |
| Hydrogen | 5.32 | 5.19 |
| Chlorine | 26.75 | 26.75 |

EXAMPLE VI 10,10-bis(4-acetoxybutoxy)-2,3,4,5-tetrachloro-3,7-tricyclo[4.3.0.1$^{2,5}$]decadiene A mixture of 20.0 grams (0.042 mole) of 5,5-bis(4-acetoxybutoxy)cyclopentadiene, 5.0 grams (0.075 mole) of cyclopentadiene and 20.0 milliliters of benzene was kept at room temperature for 96 hours and was then heated on a steam bath for 16 hours. The solvent was removed by evaporation and the product was distilled under vacuum.
Fraction I—60° C.–210° C. at 0.1 millimeter;
Fraction II—210° C.–212° C. at 0.1 millimeter;
The second fraction was analyzed as the product.
Analysis.—Calculated for $C_{22}H_{28}Cl_4O_6$:

|  | Calculated (Percent) | Found (Percent) |
| --- | --- | --- |
| Carbon | 49.82 | 48.98 |
| Hydrogen | 5.32 | 5.25 |
| Chlorine | 26.75 | 25.73 |

EXAMPLE VII 10,10-bis(3-hydroxybutoxy)-2,3,4,5-tetrachloro-3,7-tricyclo[4.3.0.1$^{2,5}$]decadiene A mixture of 20.0 grams (0.042 mole) of 5,5-bis(3-hydroxybutoxy) - 1,2,3,4 - tetrachlorocyclopentadiene, 5.0 grams (0.075 mole) of cyclopentadiene and 20 milliliters of benzene was kept at room temperature for 96 hours and was then heated on a steam bath for 16 hours. The solvent was removed and the product was distilled in vacuo.
Fraction I—148° C.–200° C. at 0.1 millimeter;
Fraction II—200° C.–208° C. at 0.08 millimeter;
Fraction II was redistilled at 188° C. at 0.65 millimeter. This distillate partially crystallized on standing. The solid was filtered off and recrystallized twice from a mixture of benzene and ligroin to give a product with a melting point of 76° C.–77° C.

Analysis.—Calculated for $C_{18}H_{25}Cl_4O_4$:

|  | Calculated (Percent) | Found (Percent) |
| --- | --- | --- |
| Carbon | 48.44 | 48.32 |
| Hydrogen | 5.42 | 5.21 |
| Chlorine | 31.78 | 32.10 |

EXAMPLE VIII 10,10 - bis(3 - acetoxypropoxy) - 2,3,4,5 - tetrachloro-8-phenyl-8-aza-3-tricyclo[4.3.0.1$^{2,5}$]decene-7,9-dione A mixture of 0.5 gram of 5,5-bis(3-acetoxypropoxy)-1,2,3,4-tetrachlorocyclopentadiene, 0.5 gram of N-phenyl maleimide and 10 milliliters of xylene were refluxed for 22.5 hours. The solvent was then removed. The product was diluted with ether and a precipitate was formed. The solid was soluble in acetone. The solid was recrystallized from a mixture of benzene and ligroin, melting point 110° C.–112° C.
Analysis.—Calculated for $C_{25}H_{25}Cl_4O_8$:

|  | Calculated (Percent) | Found (Percent) |
| --- | --- | --- |
| Carbon | 49.30 | 49.10 |
| Hydrogen | 4.14 | 4.28 |
| Chlorine | 23.14 | 20.34 |
| Nitrogen | 2.30 | 2.09 |

The polyols of this invention may be reacted with a polycarboxylic acid such as maleic acid, fumaric acid, phthalic acid or isophthalic acid, to form a polyester, or with isocyanates to form urethane resins. Due to the halogen contained in the molecule, the compounds of this invention aid in rendering fire-retardant compositions containing in them, for example, polyesters and urethane resins. The polyols are also useful chemical intermediates since they contain reactive hydroxyl groups, for example. The monocarboxylic acids of this invention may be converted to the corresponding polyols by saponification or ester interchange, as with methanol and hydrochloric acid.

The use of either the diols of Formula I of their monocarboxylic acid esters as starting materials may depend on factors other than the desired end product, for example, the availability of the starting material or the ease of purification of either the starting material or the final product. The Diels-Alder reaction products of this invention may be modified to contain either hydroxy or ester groups. The polyols may be esterified, as with sodium acetate in acetic anhydride, or the esters may be converted to the polyols stated above.

It is obvious that there is a ready interchange of both starting materials and final products which imparts a great deal of flexibility in the procedures for obtaining the compounds of this invention.

Although specific examples of the invention have been set forth, it is not intended to limit the invention solely thereto, but to include all of the variations and modifications falling within the scope of the appended claims.

I claim:
1. A composition of matter comprising a compound of the formula

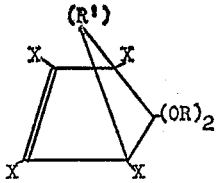

where X is selected from the group consisting of chlorine, bromine, and fluorine, R is an organic radical of at least 3 carbon atoms selected from the group consisting of hydroxy substituted alkyl radicals, said hydroxyl substituents on said R groups being in at least the 3-position with respect to the ketal oxygen, and R' is selected from the group consisting of:

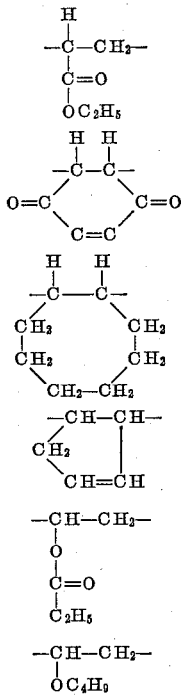

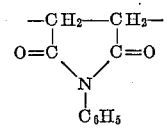

2. A composition, as in claim 1, where X is chlorine.

3. 7,7 - bis(3 - hydroxybutoxy) - 5 - phenyl - 1,2,3,4-tetrachloro-2-bicyclo[2.2.1]heptene.

4. 11,11 - bis(3 - hydroxybutoxy) - 2,3,4,5 - tetrachloro-3,8-tricyclo[4.4.0.1$^{2,5}$]dodecadiene-7,10-dione.

5. 7,7 - bis(3 - hydroxybutoxy) - 5 - carbethoxy-1,2,3,4-tetrachloro-2-bicyclo[2.2.1]heptene.

6. 10,10 - bis(3 - hydroxybutoxy) - 2,3,4,5 - tetrachloro-3,7-tricyclo[4.3.0.1$^{2,5}$]decadiene.

References Cited by the Examiner

UNITED STATES PATENTS

| 2,752,361 | 6/1956 | Robitschek et al. | 260—514 X |
| 2,800,513 | 7/1957 | Hall et al. | 260—615 |
| 2,884,426 | 4/1959 | Kottler et al. | 260—326.3 |
| 3,004,073 | 10/1961 | Wismer et al. | 260—468 |
| 3,007,958 | 11/1961 | Robitschek et al. | 260—468 |
| 3,009,946 | 11/1961 | Takei et al. | 260—468 |
| 3,033,897 | 5/1962 | Robeson | 260—488 |
| 3,059,030 | 10/1962 | Park et al. | 260—586 |

OTHER REFERENCES

Ungnade et al.: Chem. Reviews, vol. 58, pp. 280 and 281 (1958).

LEON ZITVER, *Primary Examiner.*

NICHOLAS S. RIZZO, *Examiner.*

J. TOVAR, M. M. JACOB, *Assistant Examiners.*